United States Patent
Zilberstein et al.

(10) Patent No.: US 9,628,858 B2
(45) Date of Patent: Apr. 18, 2017

(54) INDIVIDUALIZED CONTENT PRESENTATION FOR INCREASED USER INTERACTION PERFORMANCE IN GROUP SETTINGS

(71) Applicant: Microsoft Corporation, Redmond, WA (US)

(72) Inventors: Karin Zilberstein, Kirkland, WA (US); Enrique de la Garza, Sammamish, WA (US); Leah Hobart, Mountain View, CA (US); Shirlene Lim, Redmond, WA (US); Jonathan Winslow Anderson, Seattle, WA (US); Carolyn J. Fuson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 14/530,552

(22) Filed: Oct. 31, 2014

(65) Prior Publication Data
US 2016/0127775 A1 May 5, 2016

(51) Int. Cl.
*H04N 21/218* (2011.01)
*H04N 21/488* (2011.01)
(Continued)

(52) U.S. Cl.
CPC .......... *H04N 21/458* (2013.01); *A63F 13/26* (2014.09); *G06Q 30/0271* (2013.01);
(Continued)

(58) Field of Classification Search
None
See application file for complete search history.

(56) References Cited

U.S. PATENT DOCUMENTS 7,660,872 B2   2/2010  Delia et al.
7,938,727 B1   5/2011  Konkle
(Continued)

OTHER PUBLICATIONS

"International Search Report and Written Opinion Issued in PCT Application No. PCT/US2015/057677", Mailed Date: Feb. 12, 2016, 14 Pages.

*Primary Examiner* — Brian T Pendleton
*Assistant Examiner* — Jean D Saint Cyr
(74) *Attorney, Agent, or Firm* — The Watson IP Group, PLC; Vladan M. Vasiljevic

(57) ABSTRACT

Increased user interaction performance in group settings is achieved by providing individually interactive secondary content to individual users of a group of users, including a group that is consuming content from a single display device. A group of users is defined based upon detected commonalities. Secondary content is concurrently presented to the defined group of users and includes both non-interactive and interactive content. The interactive content is individually and separately presented to multiple users of the defined group, including co-located users that were consuming the primary content from a single physical display device. The individual and separate presentation includes presenting multiple panels, or sub-divisions, on the single physical display device, with individual, separate panels directed to individual ones of the multiple co-located users and the utilization of personal computing devices that are associated with specific ones of the multiple co-located users.

20 Claims, 5 Drawing Sheets

(51) Int. Cl.
  *H04N 21/81*   (2011.01)
  *H04N 21/458*  (2011.01)
  *H04N 21/466*  (2011.01)
  *G06Q 30/02*   (2012.01)
  *H04N 21/41*   (2011.01)
  *H04N 21/442*  (2011.01)
  *A63F 13/26*   (2014.01)

(52) U.S. Cl.
  CPC ... *H04N 21/4126* (2013.01); *H04N 21/44218* (2013.01); *H04N 21/4661* (2013.01); *H04N 21/812* (2013.01)

(56) References Cited

U.S. PATENT DOCUMENTS

| | | |
|---|---|---|
| 8,032,411 B2 | 10/2011 | Huh et al. |
| 8,538,814 B2 | 9/2013 | Chang et al. |
| 8,549,076 B2 | 10/2013 | Mizrahi et al. |
| 8,719,093 B2 | 5/2014 | Yerli |
| 2002/0059602 A1* | 5/2002 | Macrae ............... H04N 5/44543 725/42 |
| 2008/0098450 A1* | 4/2008 | Wu .................... H04N 21/4312 725/132 |
| 2008/0102947 A1 | 5/2008 | Hays et al. |
| 2009/0186700 A1 | 7/2009 | Konkle |
| 2009/0292608 A1 | 11/2009 | Polachek |
| 2009/0322678 A1* | 12/2009 | Lashina ................ G06Q 30/02 345/158 |
| 2010/0017725 A1 | 1/2010 | McCarthy et al. |
| 2010/0070999 A1 | 3/2010 | Morris et al. |
| 2012/0210386 A1 | 8/2012 | Kim et al. |
| 2012/0229587 A1 | 9/2012 | Sampathkumaran et al. |
| 2013/0036011 A1 | 2/2013 | Roberts et al. |
| 2013/0232012 A1 | 9/2013 | Yan et al. |
| 2014/0087862 A1 | 3/2014 | Burke et al. |
| 2014/0089048 A1 | 3/2014 | Bruich |
| 2014/0132702 A1 | 5/2014 | Leibovich et al. |
| 2014/0136318 A1 | 5/2014 | Alberth et al. |

* cited by examiner

… (1)

INDIVIDUALIZED CONTENT PRESENTATION FOR INCREASED USER INTERACTION PERFORMANCE IN GROUP SETTINGS

BACKGROUND

Much of the content that is consumed by individuals is supported, at least in part, through advertising revenue. For example, network television shows, and, even prior to that, radio broadcasts, were funded through the sale of advertising wherein advertisers paid for the right to present advertisements to the audience of such shows and broadcasts. As another example, print media, such as magazines and newspapers, are paid by advertisers to include printed advertisements, with such advertiser payments reducing the amount subscribers of such print media would otherwise have to pay to access the content printed thereon.

Because a diverse set of individuals can consume various content, such as television shows, or newspapers, the advertising included with such content necessarily is exposed to both individuals to whom such advertising is relevant, and individuals that have no interest in the advertised product or service. Additionally, because information about the individuals consuming such content is often unavailable, it can be difficult to determine beforehand which advertising will be relevant. As a result, individuals have become accustomed to finding advertisements irrelevant for their particular needs and ignoring such advertisements. Indeed, many consumers of advertising-supported content have trained themselves to purposely ignore advertisements; a behavior known as "ad blindness". For example, readers of newspapers or magazines visually skip over advertisements often without noticing the advertisements sufficiently in order to actually determine whether or not such advertisements are of interest. As another example, watchers of network television shows often perform other actions during displayed advertising, or utilize devices, such as digital video recorders that enable such watchers to fast-forward or skip over advertising without actually considering the advertising content.

From an advertiser perspective, however, such actions are undesirable because such actions reduce the likelihood of individuals engaging with the advertiser's products or services. Consequently, advertisers desire advertisements that more effectively capture individuals' attention so that each individual can more completely consider the advertised product or service.

SUMMARY

Primary content that is user desired can be displayed on one or more physical display devices and can be consumed by multiple users, including users that can be remotely located from one another as well as multiple co-located users consuming such content from a single physical display device. A group of users can be defined based upon detected commonalities, including consumption of the same primary content, explicitly established links between users, pre-defined groupings, or combinations thereof. Secondary content can be concurrently presented to the defined group of users during predefined aspects or portions of the presentation of the primary content, or during interruptions or breaks in the presentation of the primary content. Such secondary content can include both fixed, or non-interactive, content as well as interactive content. The interactive content can be individually and separately presented to multiple users of the defined group, including co-located users that were consuming the primary content from a single physical display device. The individual and separate presentation of the interactive secondary content can include presenting multiple panels, or sub-divisions, on the single physical display device, with individual, separate panels directed to individual ones of the multiple co-located users. The individual and separate presentation of the interactive secondary content can also include the utilization of personal computing devices that are associated with specific ones of the multiple co-located users, or are otherwise detected to be available to specific ones the multiple co-located users, but which were not displaying the primary content. In such a manner, the secondary content can be more engaging, on an individual basis, for a group of users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
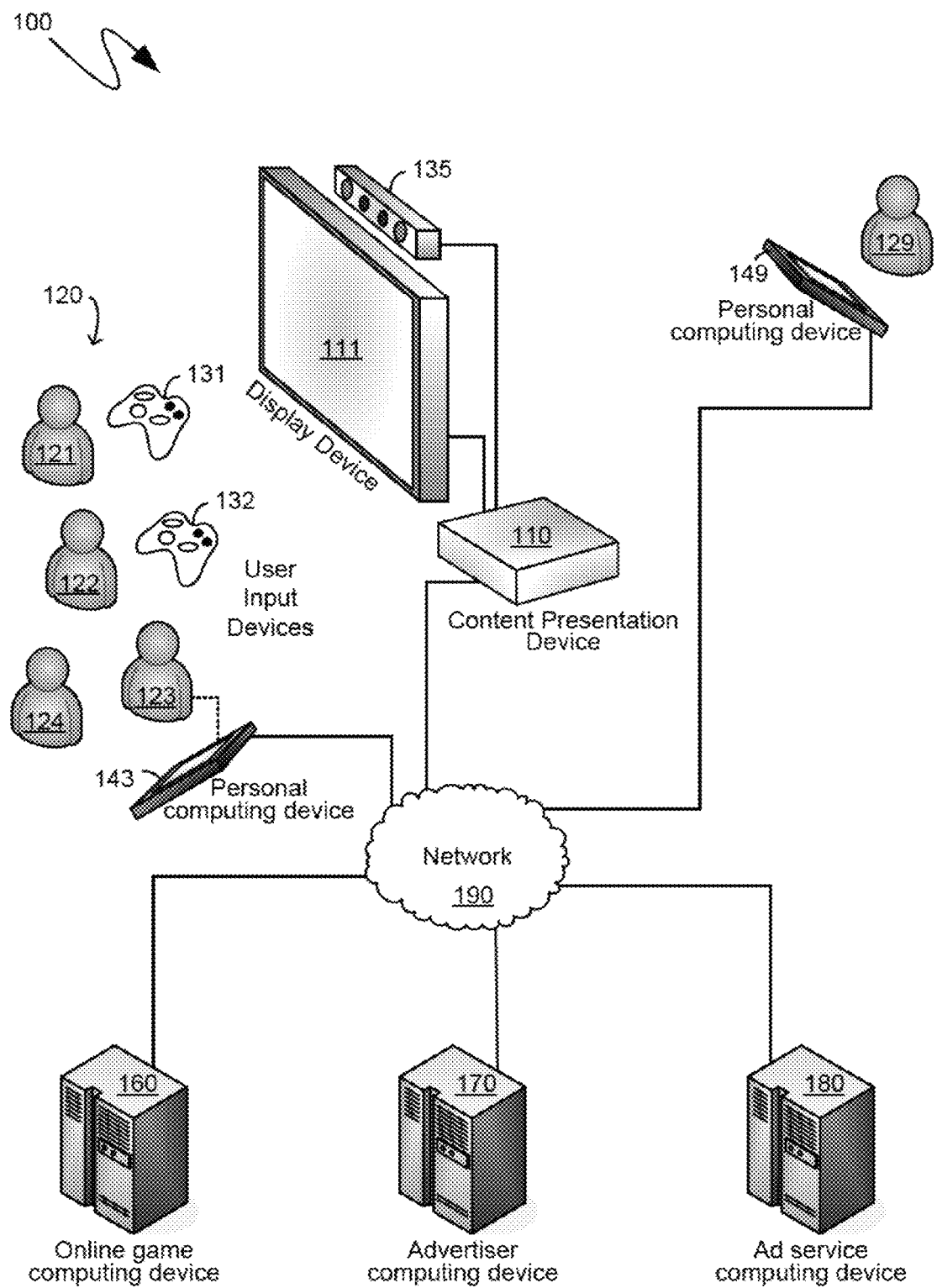
FIG. 1 is a block diagram of an exemplary system for individualized content presentation to users in group settings.

The following description relates to increasing individual user interaction performance in group settings through the presentation of interactive content in dedicated, individual subdivisions within a shared single display device, on individual, personal computing devices, or combinations thereof. More particularly, primary content that is user desired can be displayed on one or more physical display devices and can be consumed by multiple users, including users that can be remotely located from one another as well as multiple co-located users consuming such content from a single physical display device. A group of users can be defined based upon detected commonalities, including consumption of the same primary content, explicitly established links between users, pre-defined groupings, or combinations thereof. Secondary content can be concurrently presented to the defined group of users during predefined aspects or portions of the presentation of the primary content, or during interruptions or breaks in the presentation of the primary content. Such secondary content can include both fixed, or non-interactive, content as well as interactive content. The interactive content can be individually and separately presented to multiple users of the defined group, including co-located users that were consuming the primary content from a single physical display device. The individual and separate presentation of the interactive secondary content can include presenting multiple panels, or sub-divisions, on the single physical display device, with individual, separate panels directed to individual ones of the multiple co-located users. For example, a single television (TV) monitor screen can be subdivided into four panels if four users were together watching video content on such a single TV monitor. The individual and separate presentation of the interactive secondary content can also include the utilization of personal computing devices that are associated with specific ones of the multiple co-located users, or are otherwise detected to be available to specific ones the multiple co-located users, but which were not displaying the primary content. Such personal computing devices can include computing devices that a user would carry with themselves, or otherwise have conveniently accessible, including, for example, cellular telephone computing devices, tablet computing devices, laptop computing devices, smart watch computing devices, and other like computing devices. In such a manner, the secondary content can be more engaging, on an individual basis, for a group of users, thereby increasing individual user interaction performance within a group setting.

The techniques described herein focus on advertising within the context of the consumption of advertising-sponsored content, which can be considered to be "user-desired content" in that the user wishes to consume such content and receives advertisements as a condition of consuming such content at a particular cost, which is typically a reduced cost, or free, due to the fact that such content is, at least in part, advertising-sponsored. However, such descriptions are not meant to suggest a limitation of the described techniques. To the contrary, the described techniques are equally applicable to any environment in which is desirable to increase individual user interaction performance within the context of a group of users.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other devices capable of executing the computer-executable instructions in the manner intended to produce the desired results, including handheld devices, multi-processor systems, microprocessor based or programmable consumer electronics, network PCs, minicomputers, mainframe computers, video game consoles, digital video recorders, audio and/or video content presentation devices and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and other like hardware logic components and devices.

Turning to FIG. 1, an exemplary system 100 is illustrated, providing context for the descriptions below. As illustrated in FIG. 1, the exemplary system 100 can comprise a content presentation device 110 that can be communicationally coupled to a physical display device 111. The physical display device 111 can be any type of display device that can generate a viewable physical image, including Liquid Crystal Display (LCD) devices, plasma-based devices, Organic Light Emitting Diode (OLED) devices, phosphorus-based devices, and other like display devices. As will be recognized by those skilled in the art, such display devices generate images through the manipulation of discrete, physical elements that, in aggregate, comprise the image being presented by the display device. For example, an LCD-based device generates images through the physical orientation of individual, physical liquid crystals, which, in aggregate, form the image being presented by the LCD-based device.

The content presentation device 110 can be any device having sufficient processing capability to execute the computer-executable instructions, and perform the steps, described herein. For example, the content presentation device 110 can be a video game console, a digital video recorder, a set-top box provided by a content or network provider, or any of the above-enumerated computing devices. The content presentation device 110 can further comprise sufficient hardware and software capability to control a display device, such as the display device 111, in order to cause the display device 111 to generate images thereon. One or more users, such as the users 121, 122, 123 and 124, collectively referred to as the users 120, can utilize the content presentation device 110 to consume content displayed by the content presentation device 110 via the physical display device 111.

The users 120 can interface with the content presentation device 110 through various user input devices including, for example, a conventional remote control, a video game controller, such as the exemplary video game controllers 131 and 132, an audio/visual input device 135, as well as more traditional computer input devices, such as a trackpad, a mouse, keyboard, and other like user input devices. As will be recognized by those skilled in the art, the audio/visual input device 135 can comprise sensors by which the physical appearance and physical movements of the user, as well as audio generated by the user, can be utilized to provide user input, such as to the content presentation device 110. As will also be recognized by those skilled in the art, multiple ones of the users 120 can provide input simultaneously to the content presentation device 110. For example, the audio/visual input device 145 can distinguish between multiple different users, such as from among the users 120, and can detect the physical movements of individual ones of those users. Thus, for example, if the content presentation device 110 was executing a video game which multiple different ones of the users 120 were playing, those multiple different users could provide input, on an individual basis, to the videogame by physically performing movements that could be simultaneously detected by the audio/visual input device 135. As another example, multiple ones of the users 120, such as, for example, the users 121 and 122, could simultaneously provide input to, for example, the videogame being executed by the content presentation device 110, through physical controllers, such as the exemplary video game controllers 131 and 132, respectively.

The content presentation device 110 can display, on the display device 111, content that can be consumed by multiple users, such as the users 120, simultaneously. For example, the content presentation device 110 can be executing a video, or movie, player application and the video content being generated on the display device 111, by the content presentation device 110, can be simultaneously viewed, and, thereby, consumed, by any one or more of the users 120. As another example, and as enumerated above, the content presentation device 110 can execute a video game that can cause the content presentation device 110 to display, on the display device 111, video game content that can be both viewed by, and controlled by, multiple ones of the users 120. Even in such instances, however, only a subset of the users 120 may actively be controlling or interacting with the content presentation device 110. Others of the users 120 may be merely viewing the content being generated on the physical display device 111. Consequently, as utilized herein, the term "user" means any individual that consumes content presented by a device, irrespective of whether such an individual is actively controlling the device, or the content presented thereby, or is merely viewing the content without active control.

In certain instances, the content presented by the content presentation device 110 can include advertising-supported content. Such advertising-supported content can include television shows, movies, video games, and other like advertising-supported content. Typically, such advertising-supported content will have defined periods of time, defined instances, or defined circumstances during which advertisements can be presented. Such advertisement-presentation constructs are typically referred to as "ad breaks", and can include predefined blocks of time occurring at defined intervals during the presentation of advertising-supported content, such as television shows and movies, and can also include predefined blocks of time triggered by events within the context of a video game, such as when a game player exits the game to return to a "game center", when a game player completes a level, or other like triggering events.

The content presentation device 110 can be communicationally coupled with a network 190, through which the content presentation device 110 can obtain content to display to its users, including advertising-supported content. For example, the content presentation device 110 can download movies or television shows from online video content providers that can also be communicationally coupled to the network 190. As another example, rather than downloading content, the content presentation device 110 can obtain content in a real-time or on-demand manner, such as audio or video content that is streamed to the content presentation device 110 via the network 190.

Some of the content obtained by the content presentation device 110, from the network 190, and presented to one or more of the users 120, via the display device 111, can include content that is part of a multi-user activity, such as a multi-user online video game, a multi-user videoconference or video chat session, and other like multi-user activity. For example, the content presentation device 110 can execute a video chat application by which one or more of the users 120 can communicate with a remote user such as, for example, the exemplary user 120, who can be utilizing a personal computing device, such as the exemplary personal computing device 149, that is also communicationally coupled to the network 190, and which is also executing a video chat application. In such an example, the content presented, by the content presentation device 110, on the display device 111, to the users 120, can depend both upon the actions of the users 120, as well as the action of the remote user 129, as communicated to the content presentation device 110 via the network 190 by, for example, the video chat application being executed on the personal computing device 149 that is being utilized by the remote user 129. As another example, the content presentation device 110 can execute a multi-user online video game application, where one or more of the users 120 that are co-located with the content presentation device 110 can interact with other, remote users, such as, for example, the exemplary remote user 129, within the context of the multi-user online video game application. In such an example, the content presented by the content presentation device 110, on the display device 111, can be based on both the actions of the users 120 that can be co-located with the content presentation device 110, as well as other users, such as the exemplary remote user 129. More specifically, the multi-user online video game application being executed by the content presentation device 110, as well as the multi-user online video game application being executed by the personal computing device 149, can interact with one or more server computing devices, such as the exemplary server computing device 160, which can also be communicationally coupled to the network 190, and which can be hosting server-based portions of the multi-user online video game application environment. Consequently in such a multi-user online video game context, the content presented by the content presentation device 110, such as via the display device 111, can include content received via the network 190 including, for example, from the exemplary personal computing device 149, as well as the exemplary server computing device 160.

The content presented by the content presentation device 110 can include advertising-sponsored content that can result in the users 120 being exposed to advertisements. As indicated previously, while the descriptions below will be provided within the context of advertising-sponsored content, the mechanisms described herein are not so limited. Accordingly, the term "primary content", as utilized herein, means content that is selected by a user to be consumed by that user, and the term "secondary content", is utilized herein, means content that is provided with the primary content, but which was not explicitly selected by the user. As indicated previously, secondary content can include advertising, as well as other types of content. For purposes of clarity of description, however, specific reference is made to advertising content. Thus, if the primary content being presented by the content presentation device 110, on the display device 111, is advertising-sponsored content, then the presentation of such content can include, or be interrupted by, the presentation of advertisements, or other like secondary content.

Consequently, the exemplary system 100 of FIG. 1 additionally illustrates advertisement service computing devices, such as the exemplary advertisement service server computing device 180, that can be part of an advertisement service. The advertisement service can receive advertisements from one or more advertisers, which the advertisement service can then select for presentation to various users by transmitting such advertisements to content presentation devices, such as the exemplary content presentation device 110, via the network 190. The advertisement service can define guidelines or formats applicable to the advertisements provided to it. Advertisers seeking to take advantage of the advertising service can provide advertisements in accordance with such guidelines or formats. For example, an advertiser can use an advertiser computing device, such as the exemplary advertiser server computing device 170, which can also be communicationally coupled to the network 190, to communicate one or more advertisements, via the network 190, to an advertising service computing device, such as the exemplary advertisement service server computing device 180.

In addition to receiving advertisements from advertisers, an advertising service can also receive information regarding the audience to which advertisements can be displayed, including, for example, information from the content presentation device 110, and can select advertisements to be displayed by the content presentation device 110, on the physical display device 111, based on such information. For example, advertisements can be selected, by an advertisement service, based upon the type of content with which they will be presented, such that content directed towards older viewers can receive advertisements for, for example, car insurance, while content directed toward younger viewers can receive advertisements for, for example, dolls or other toys.

Advertisements can also be selected based upon more specific information regarding the particular users that are being provided content from a particular content presentation device. For example, advertisements sent to the content presentation device 110 can be selected based upon information regarding one or more of the users 120. More specifically, users, such as the users 120, can be invited to provide, or allow access to, certain personal information that can aid in the tailoring of the advertisements presented to such users. To protect users' privacy, users would be required to take one or more affirmative actions before their personal information could be collected, and, in the absence of such affirmative action, their personal information would not be collected. From the users' perspective, there can be meaningful benefits to allowing access to some discrete portion of their personal information. For example, such users may allow access to personal information simply because they desire more applicable advertising. As another example, users can be provided with additional services, or benefits, in exchange for providing, or allowing access to, some of their personal information. As yet another example, users can be compensated, either monetarily or through products and services, in exchange for providing, or allowing access to, some of their personal information.

According to one aspect, the advertisements, or other secondary content that can be provided, such as to the content presentation device 110, can include both non-interactive content as well as interactive content. The interactive content can be presented to users in such a manner that a separate presentation of such interactive content is provided for each user, of a defined group, thereby enabling each of those individual users to separately interact with the interactive secondary content, including in situations where multiple users of the group are co-located and can have been consuming the primary content from a single source, such as the single display device 111. Within the context of the exemplary system 100 shown in FIG. 1, such secondary content, comprising both static and interactive content, can be provided to content presentation devices, including, for example, the exemplary content presentation device 110, as well as the exemplary personal computing devices 143 and 149, by an advertising service computing device, such as the exemplary advertising service computing device 180. The advertising service itself can receive the advertisements, including both static and interactive content, such as in accordance with the template specified by the advertising service, from advertiser computing devices, such as exemplary advertiser computing device 170.

Figure 2:
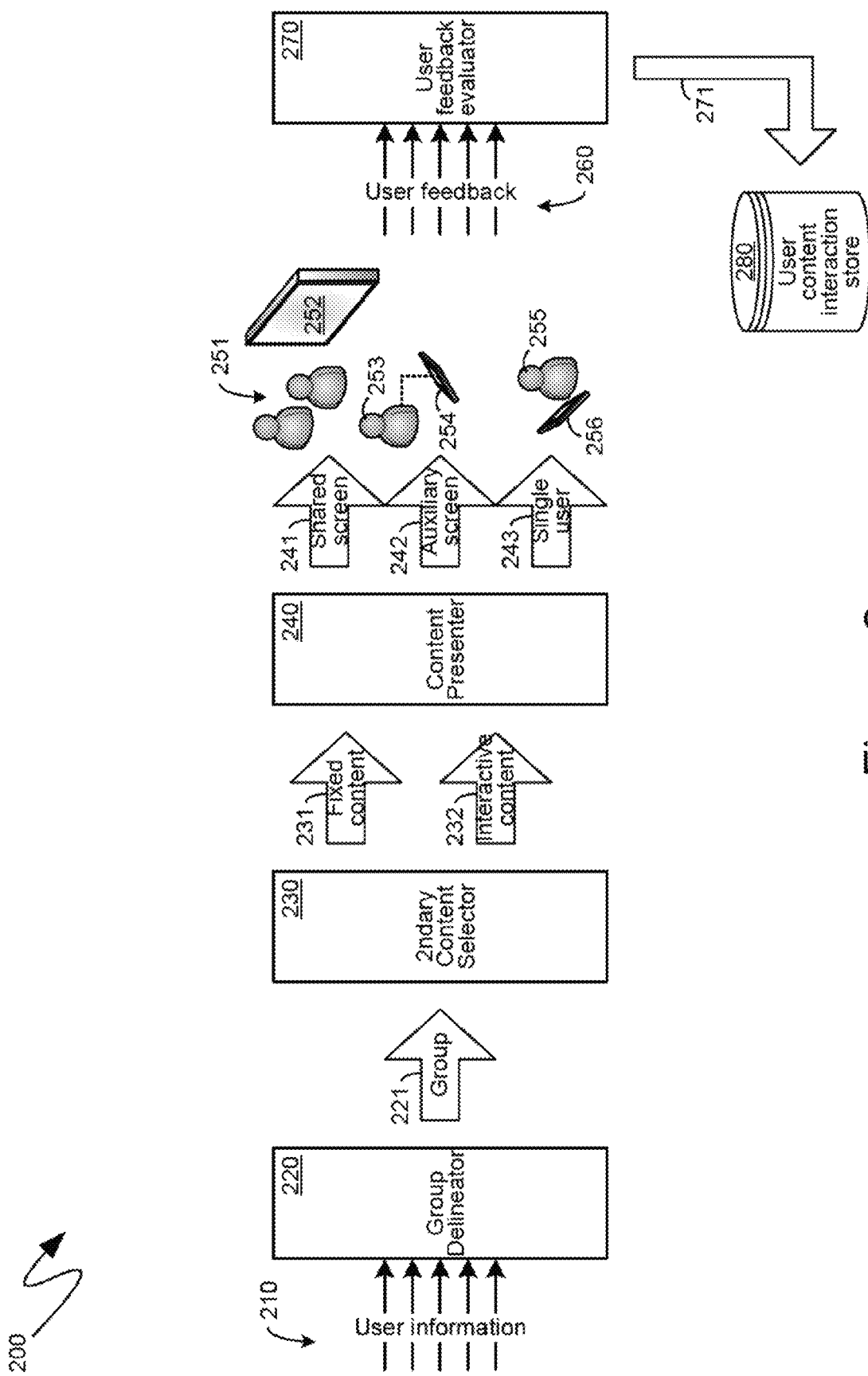
FIG. 2 is a block diagram of exemplary components providing individualized content presentation to users in group settings.

Turning to FIG. 2, the exemplary system 200 shown therein illustrates an exemplary set of components and operations by which individual users, of a defined group of users, can be individually provided with interactive content, responsive specifically to those users, on an individual basis, even in situations where multiple users, of that defined group of users, are co-located and were consuming the primary content from a single source, such as from a single display device. Initially, user information 210 can be received by a group delineator component 220, thereby enabling the group delineator component 220 to define a group 221 of two or more users. The mechanisms utilized by the group delineator component 220 to define such a group 221 can depend upon the user information 210 that is available. According to one aspect, the user information 210 can indicate a common activity among multiple users that are consuming the primary content. For example, the user information 210 can indicate that specific users are engaged with each other in a multi-user online video game. As another example, the user information 210 can indicate that specific users are engaged with each other in a video chat session. In such instances, the group delineator 220 can define the group 221 to be those individual users that are engaged with each other in a common activity. Another example of a common activity that can be utilized, by the group delineator 220, to define a group can be the consuming of the same primary content. For example, users in two or more different physical locations can commonly consume the same primary content, such as a same television show, or a same televised sporting event. In such an instance, the consumption of the same primary content, such as the show or sporting event, at the same time, can be indicia of a group that can be utilized by the group delineator 220. However, while the consumption of the same primary content can be an indicator of a group, the different users of a group can also consume different content. For example, returning to the above examples, two different, remotely located groups of users engaging in a single video chat will, technically, consume different primary content, as the first group will consume video content of the second group and the second group will consume video content of the first group. As another illustrative example, the content being consumed by each remote user playing a multi-player video game may be slightly different, as each user may be presented the game content from a different in-game perspective.

According to another aspect, the user information 210 can comprise location information by which group activity can be inferred. For example, user information 210 can reveal that a number of different users are all in a common room viewing a common display device that is currently being utilized to present the primary content which can, in the present example, be a movie or television show. In such an instance, the group delineator 220 can define the group 221 to be those individual users that have been detected as present in a room in which the primary content is being consumed, or as those users that have been detected as viewing a common display device.

The user information 210 can be collected in a myriad of ways, including existing mechanisms by which users identify themselves to various systems, mechanisms or environments. For example, the user information 210 can comprise information obtained from explicit user logins, such as one or more users logging into a video game account, or other content consumption account. As will be recognized by those skilled in the art, typically, a single, unique, user identifier is assigned to each user as part of the mechanism by which the user establishes an account, and subsequent user logons serve to uniquely identify such a user. Other mechanisms by which users can be identified can include facial recognition functionality, such as within the context of audio/visual input devices. For example, a user can establish a content consumption account and, as part of the account registration, can provide images to facilitate facial recognition. To the user's advantage, then, when the user seeks to log on to such an account, the user need do nothing more than simply stand in front of an audio/visual input device. For purposes of identifying the group, however, the fact that the user was detected, such as through facial recognition, as being present in the room can aid the group delineator 220 in defining the group 221. For example, individual users, from among a group of people who have gathered together to watch a television show, can be identified based upon facial recognition that can be performed by an audio/visual input device that can be positioned proximate to the display device such that the people watching the television show will be visible to the audio/visual input device.

Yet another mechanism by which users can be identified can include proximity detection with other devices with which users are associated. For example, the user can add information regarding other devices that the user owns, or is associated with, to the user's content consumption account, such as, for example, an online game account, an online profile, or other like account that can aid the user in obtaining and consuming content. Such other devices can then be detected through short-range signaling mechanisms as being proximate to the content presentation device presenting the primary content to one or more users. For example, such other devices can be communicationally coupled to the same wireless base station as the content presentation device. Alternatively, as another example, such other devices can be within range to establish a peer-to-peer communicational connection. In such instances, user information 210 can identify a user as being proximate to, for example, the content presentation device presenting the primary content, not based on, for example, facial recognition, or other direct physical evidence of the user's location, but rather based upon a detected closeness of the computing device, such as a cellular telephone, that is associated with the user.

In defining the group 221, the group delineator 220 can identify not only two or more users that are part of the group 221, but can further identify the computing devices through which such users are consuming content, as well as other computing devices that can be associated with such users, but which may not necessarily be currently active in the consumption of content, such as cellular telephones that the users are merely carrying in their pockets. Alternatively, or in addition, the group delineator 220 can define a group 221 by merely identifying the users that are within it, or by further specifying which devices such users are utilizing to consume the primary content. In the case of the former, subsequent information, such as, for example, information regarding auxiliary devices, can then be obtained from existing user information, such as user profile information and the like.

According to one aspect, a secondary content selector 230 can utilize information regarding the defined group 221 to select secondary content to be presented to such a group. More specifically, the secondary content selector 230 can identify specific secondary content to present to the users of the group 221 based upon both information that can be provided with such secondary content, as well as information regarding the users of the defined group 221, which the secondary content selector 230 can either receive directly, or can obtain from sources such as the aforementioned user profiles. Within the context of advertising, advertisers can identify specific categories of users to which they desire their advertising to be directed, or specific circumstances within which they desire their advertising to be presented. The secondary content selector 230 can take into account such requests and can compare such information to information regarding the users of the defined group 221 in order to determine an appropriate advertisement to display to the group.

According to one aspect, each user of the group can receive the same secondary content, selected by the secondary content selector 230, substantially simultaneously. For example, if the defined group 221 comprises two different sets of users in two different physical locations that are engaged in a video chat with one another, then both sets of users can receive the secondary content substantially simultaneously. Consequently, in selecting which secondary content to display to the defined group 221, the secondary content selector 230 can select secondary content best suited for the users of the defined group 221 on an aggregate basis.

As indicated previously, according to one aspect, the secondary content selector 230 can select secondary content that includes both a fixed content portion 231 and an interactive content portion 232. The fixed content portion 231 can comprise content that can be presented to users, but does not afford the users the ability to interact with such content. By contrast, the interactive content 232 can provide users with the ability to interact with such content including, for example, triggering the presentation of different content, responding to questions posed by the content, modifying the content, and other like interactive capabilities. As detailed above, it can be desirable for users to interact with secondary content. More specifically, such as in an advertising context, interactive advertisements can be more effective in communicating the benefits of an advertised product or service and, consequently, can be more desirable to advertisers. From a user perspective, interactive advertisements can afford the user the ability to focus on aspects of an advertised product of or service that may be of greater interest to the user. They way of a simple example, an interactive advertisement for an automotive vehicle can be utilized by some users to collect greater information regarding the performance aspects of the advertised vehicle, while the same interactive advertisement can be utilized by other users to collect greater information regarding the safety aspects of the same advertised vehicle.

The secondary content selected by the secondary content selector 230, including the fixed content portion 231 thereof, and the interactive content portion 232 thereof, can be provided to a content presenter 240 for presentation to the users of the defined group 221 in a substantially simultaneous manner. For example, as indicated above, secondary content can be presented to users during predefined portions, breaks, interruptions, contexts, and other like aspects of the primary content that such users are consuming. Consequently, at a time when the selected secondary content is to be presented to the users of the defined group 221, the content presenter 240 can, substantially simultaneously, provide the selected secondary content to the users of the defined group 221, irrespective of the physical locations of such users. The specific time when the secondary content is to be presented can be triggered externally, such as by the presentation of the primary content itself, or it can be determined by the content presenter 240.

Some of the users of the defined group 221, such as the exemplary user 255, can be in a single-user environment where they were consuming the primary content "by themselves", such as through a personal content presentation device 256. Such users can receive the secondary content in substantially the same manner, as illustrated by the arrow 243. More specifically, those users of the defined group 221 that are consuming content in single-user environments can simply be presented the secondary content, by the content presenter 240, via the content presentation device that such users were utilizing to consume the primary content. Additionally, the secondary content can be presented in a traditional manner, such as by being displayed in the same portion of the display of the personal content presentation device 256 as the primary content was displayed in. Thus, for example, the fixed content 231 can be presented to the user 255 within the same portion of the display of the personal content presentation device 256 that was being utilized to display the primary contact. In an analogous manner, the interactive content 232 can, likewise, be displayed on the personal content presentation device 256, and the user 255 can interact with such content through user input received by the personal content presentation device 256, or one or more user input peripherals communicationally coupled thereto.

Other users of the defined group 221, as indicated previously, can have been consuming the primary content in a group setting such as, for example, a collection of users all viewing a television show from a single display device. In such an instance, the content presenter 240 can provide the secondary content such that it will be displayed in accordance with a shared screen approach. More specifically, and as will be detailed further below, in an environment where multiple users can be consuming content from a single display device, such as, for example, the multiple users 251 that can be consuming content from a single display device 252, the secondary content can be delivered to such users in such a manner that individual ones of the multiple users 251 can each, separately, interact with the interactive content portion 232 of the secondary content. For example, the display of content, on the physical display device 252, can be subdivided into different, and independently changeable, portions or sections. One such portion can display the interactive content portion 232 of the secondary content for one of the users 251, while another, different portion of the display can be utilized to display the interactive content portion 232 for another one of the users 251. In such a manner, represented by the arrow 241, each individual user, of the multiple users 251, can individually interact with the interactive content portion 232 of the secondary content being presented to such multiple users 251, even though only a single physical display device, such as the exemplary display device 252, is being utilized to present such secondary content to the multiple users 251.

According to one aspect, some of users, from among a group of multiple users that are co-located with one another and are consuming primary content from a single display device, can have associated with them auxiliary devices, such as the exemplary auxiliary device 254 that can be available to an associated user 253, who can be part of the multiple users 251 that were consuming primary content from the display device 252. According to such an aspect, the interactive content portion 232 of the secondary content can be provided, as illustrated by the arrow 242, to the auxiliary device 254, which can be a cellular telephone, a tablet computing device, or other like personal or portable computing device that a user could have co-located with them while still consuming primary content from a shared display device, such as, for example, the display device 252. The presentation of the interactive content portion 232 to the auxiliary device 254 can enable the user 253 to individually interact with the auxiliary content portion 232. The presentation of the interactive content portion 232 to the auxiliary device 254 can be as an alternative to the presentation of the interactive content portion 232, for the user 253, on a portion of the display device 252, or it can be in addition to such a presentation of the interactive content portion 232.

When secondary content, having an interactive content portion, is presented to users, users' interaction with such an interactive content portion can be monitored and logged for subsequent utilization. For example, the exemplary system 200 of FIG. 2 illustrates user feedback 260 that can be received from users, such as the exemplary multiple users 251, and the single user 255, as part of those users' interaction with the interactive content portion 232. Such user feedback 260 can be received by the user feedback evaluator 270, which can then store such information, as illustrated by the arrow 271, into a user content interaction store, such as the exemplary user content interaction store 280. Although not explicitly shown, the secondary content selector 230 can have access to the user content interaction store 280, the user feedback evaluator 270, or combinations thereof, and can utilize information gleaned from the user feedback 260 to more accurately select subsequent secondary content for the users who previously received the previously selected secondary content, or to improve secondary content selection mechanisms for other sets of users. For example, the secondary content selector 230 can utilize information obtained from the user feedback 260, whether obtained from the user feedback evaluator 270 directly, or obtained from the user content interaction store 280, to determine that secondary content directed to, for example, automobiles, was mostly ignored by the defined group of users 221 to whom such secondary content was previously presented. The secondary content selector 230 can then determine to no longer present automotive secondary content to the defined group of users 221. As another example, the secondary content selector 230 can utilize information obtained from the user feedback 260, such as, for example, information that the defined group 221 did not meaningfully interact with automotive secondary content, to determine that other users having similar demographic information, or other like information, as the defined group 221 should, likewise, not be presented with secondary content directed to automotive topics.

Although not specifically illustrated in FIG. 2, the group delineator 220 can continually receive updated user information 210 and can monitor such user information 210 in order to determine whether to change the defined group 221 to either include new users, or exclude users that were previously defined to be part of the group 221. Alternatively, or in addition, the group delineator 220 can interact with the user feedback evaluator 270 such that user feedback 260, either by itself, or in combination with the user information 210, can trigger the definition of a new group of users. For example, the user information 210, either by itself or in combination with the user feedback 260, can indicate that, for example, not only did the user 253 not interact with the interactive content portion 232, but the user 253 can have actually left the room, thereby reducing the users that are part of the multiple users 251 that were consuming the primary content on the display 252. In such an instance, the group delineator 220 can generate a newly defined group that now excludes the user 253. As another example, the user information 210, again, either by itself or in combination with the user feedback 260, can indicate that, for example, a new user has walked into the room with the multiple users to enter 251 and is now viewing content being presented on the display 252. The group delineator 220 can then define a new group that now includes the new user that has walked into the room.

According to one aspect, such changes in the group definition can occur rapidly, or in real-time as it would be perceived by a user. For example, from the perspective of a new user walking into a room where secondary content is being presented in accordance with the above-described shared screen approach, the new user would see the subdivisions being presented on the display device 252 change in response to their walking into the room, with a new portion of the display now presenting the interactive content portion 232 of the secondary content that is directed specifically to, and is interactive uniquely with, such a new user.

Although illustrated within the context of a single system, the exemplary system 200, shown in FIG. 2, can comprise components that can execute on multiple different systems, or computing devices. For example, the group delineator 220 can execute on a centralized, server computing device, such as one of those illustrated exemplary system 100 shown in FIG. 1, or it can execute on one or more of the content presentation devices such as, for example, the content presentation device 110 that was shown in FIG. 1. The secondary content selector 230 can, according to one aspect, execute on an advertisement service server computing device, such as that illustrate an exemplary system 100 shown in FIG. 1. Alternatively, the secondary content selector 230 can execute on a content presentation device, such as the exemplary content presentation device 110 as shown in FIG. 1, as can the content presenter 240. The content presenter 240 can, according to one aspect, execute on each content presentation device including, for example, the personal computing device 254. Similarly the user feedback evaluator 270 can execute on a centralized server computing device, on a content presentation device, or on combinations thereof.

Figure 3:
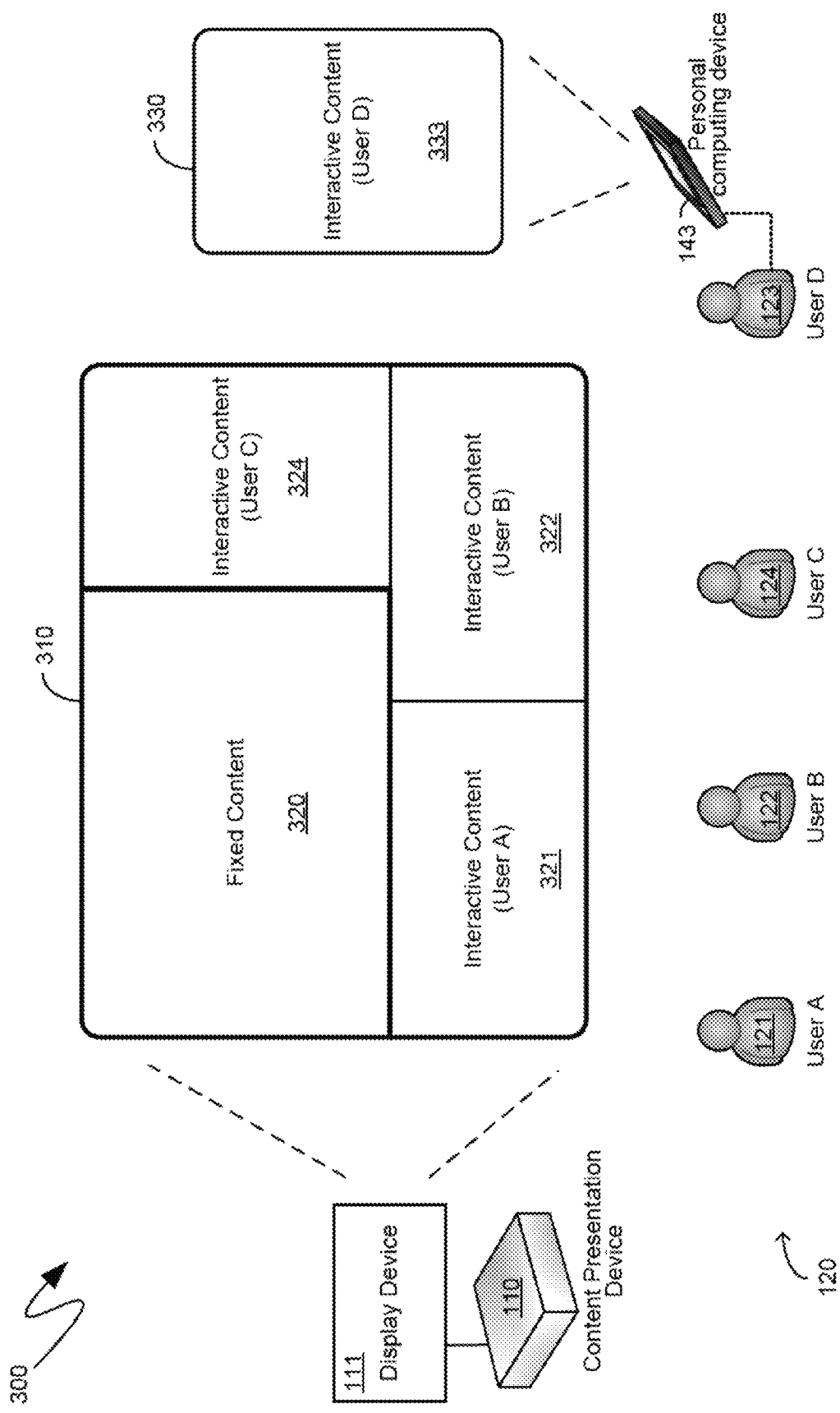
FIG. 3 is a block diagram of an exemplary user interface providing individualized content presentation to users in group settings.

Turning to FIG. 3, the system 300 shown therein illustrates an exemplary provision of interactive secondary content to multiple users, on an individual basis, in environments where the multiple users were consuming the same primary content from the same display device. More specifically, and as illustrated by the exemplary system 300, the users 121, 122, 123 and 124, collectively the users 120, can be consuming primary content from a single display device, such as exemplary display device 111, which can be communicationally coupled to a content presentation device, such as the exemplary content presentation device 110, both of which were described in greater detail above in reference to FIG. 1, where they were also shown. As part of the consumption of the primary content, the users 120 can also be presented secondary content, which, as indicated, can occur during predefined portions of the primary content, can be triggered by events occurring within the context of the primary content, or can be presented during interruptions or breaks in the primary content.

The presentation of such secondary content can include, as indicated previously, interactive secondary content. The exemplary interface 310 illustrates one aspect by which multiple ones of the users 120 can be individually provided with individually controlled interactive content even though the users 120 can be co-located and can have been sharing their consumption of the primary content from the single display device 111. More specifically, according to one aspect, prior to the presentation of the exemplary interface 310, the display device 111 can have been presenting primary content that was presented across all, or substantially all, of the content presentation area of the display device 111. Subsequently, upon commencement of the presentation of secondary content, the secondary content can, initially, be only fixed, or non-interactive, content, which can, like the primary content, be presented across all, or substantially all, of the content presentation area of the display device 111. When, as part of the presentation of the secondary content, interactive secondary content can be presented, the interface presented by the exemplary display device 111 can transition to an interface such as exemplary interface 310, where the fixed secondary content can be presented only within a portion of the content presentation area of the display device 111. For example, as illustrated by the exemplary user interface 310, the presentation of the fixed secondary content can transition from being presented across all, or substantially all, of the content presentation area of the display device 111 to a subsection 320 of the content presentation area. As will be recognized by those skilled in the art, such a transition can include graphical refinements, such as, for example, animations illustrating the shrinking of the fixed secondary content from being presented across all, or substantially all of the content presentation area, to being presented only within the subsection 320, representing only a portion of the content presentation area of the exemplary display device 111.

The remaining content presentation area can then be utilized to separately display interactive content for multiple ones of the users 120. For example, as illustrated by the exemplary user interface 310, the remaining content presentation area, of the display device 111, that is not otherwise consumed by the fixed content being displayed within the subsection 320, can be divided into subsections 321, 322 and 324, such as in the manner shown. Each subsection can independently display the interactive content portion of the secondary content and can be independently controlled by a single one of the users 120. For example, the user 121 can individually and uniquely interact with the interactive content being displayed within the subsection 321 of the content presentation area of the display device 111. In a similar manner, the user 122 can individually and uniquely interact with the interactive content being displayed in the subsection 322, and the user 124 can individually and uniquely interact with the interactive content being displayed within the subsection 324. In such a manner, multiple co-located users that were consuming primary content from a single source, such as the single display device 111, can each, individually, interact with the interactive content portion of the secondary content. Insofar as providing user input to interact with the interactive content portion of the secondary content, users can provide input through any of the aforementioned mechanisms, many of which can be utilized within, for example, the same room, without interfering with one another. For example, multiple users can each be utilizing separate, independent game controllers and can, thereby, separately provide input to different ones of the interactive content, such as, for example, the interactive content being presented within the subsections 321 and 322. In such an instance, the provision of multiple, independent input can be analogous to the provision of multiple, independent input within the context of multi-user video games, which is well known to those skilled in the art. As another example, multiple users within the same room can each be providing input through their physical movements that can be captured by an audio/visual input device, which, according to known mechanisms, can distinguish between different users and the input being provided thereby. Other input forms are equally contemplated to enable the users 120 to provide input to, and interact with, the interactive content being presented outside of the fixed content area 320, including, for example, voice-based input, gesture-based input, movement-based input, peripheral-based input, touch-based input, or any other input form or device.

Some users that are co-located with others, such as, for example some of the users 120, can have available to them personal, or auxiliary computing devices, such as exemplary personal computing device 143. By way of a specific example, the user 123 can be in the same room as the other users 120, but can have their cellular telephone, tablet computing device, or other like personal computing device with them. According to one aspect, rather than utilizing a portion of the contents display area of the display device 111, the interactive content portion of the secondary content that is specific to, and responsive to, the user 123 can be presented on the personal computing device 143 that the user 123 has with them, or is otherwise associated with them. Thus, as illustrated in the exemplary system 300 of FIG. 3, an exemplary user interface 330 can be presented on the personal computing device 143 by which the interactive content portion of the secondary content can be presented, utilizing at least some, if not all, or substantially all, of the content display area of the display device of the personal computing device 143. For example, the exemplary user interface 330 illustrates the interactive content portion of the secondary content being presented across substantially all of the content display area, in the form of the portion 333 that is shown in FIG. 3.

According to another aspect, although not specifically illustrated by the system 300 of FIG. 3, the presentation of interactive content on an auxiliary device, such as the presentation of the interactive content for the user 123 as part of the exemplary user interface 330 that can be displayed by the personal computing device 143 associated with such user, can be in addition to, as opposed to as an alternative of, the display of interactive content for the user 123 on a shared display device, such as, for example, the display device 111. Thus, according to such an aspect, in addition to the subsections 321, 322 and 324, the content presentation area of the display device 111 could have another subsection (not shown) within which interactive content could be displayed that is directed specifically to, and responsive to, the user 123. In such an aspect, the interactive content displayed of the personal computing device 143 could be duplicative of such content or it could be an extension of such content, such as additional content or a display of controls to control the interactive content being displayed within the subsection on the display device 111.

As indicated previously, the defined group of users can be dynamically updated and modified in accordance with the participation, or lack thereof, by one or more individual users. For example, user 124 can choose to leave the room in which the other users, of the users 120, are gathered to consume the primary content on the display device 111, which can also be in the same room. The user's departure can be detected, such as by an audio/visual input device, by proximity sensors in, for example, personal computing devices that the user carries with them, or through other mechanisms. As indicated previously, upon detecting that such a user has left the room, the defined grouping of users can be updated to now exclude such a user. Consequently, according to one aspect, when the user 124 leaves the room, the exemplary user interface 310 can dynamically update to no longer include the interactive content being presented in the subsection 324 of the exemplary user interface 310. Instead, for example, the subsection 320, within which the fixed content is being presented, can expand to occupy the content presentation area previously occupied by the subsection 324. As another example, the subsection 321 and 322 can expand to occupy the content presentation area previously occupied by the subsection 324. As yet another example, combinations of those can occur to occupy the content presentation area previously occupied by the subsection 324.

Similarly, as another example, should another user, not explicitly illustrated in FIG. 3, walk into the room and, thereby, join the users 120, such a new user's presence can be detected, and again, through any of the above-described mechanisms, the exemplary user interface 310 can be accordingly and dynamically updated. For example, the content presentation area occupied by the subsections 321, 322 and 324 in the exemplary user interface 310 can be re-divided to now include four subsections, including one new subsection for the new user that has walked into the room.

While described within the context of a fixed content portion and an interactive content portion of secondary content, the above-described mechanisms are equally applicable to a combination of primary content and interactive secondary content. More specifically, the subsection 320, of the exemplary user interface 310, can present not only fixed secondary content, but also primary content. Thus, for example, the portions of the exemplary user interface 310 directed to the presentation of interactive content, such as the exemplary subsections 321, 322 and 324, can remain visible and active, thereby enabling the users 120 to continue to, individually, interact with such interactive content, while the portion 320, of the exemplary user interface 310, can return to presenting the primary content, or other, unrelated secondary content.

Figure 4:
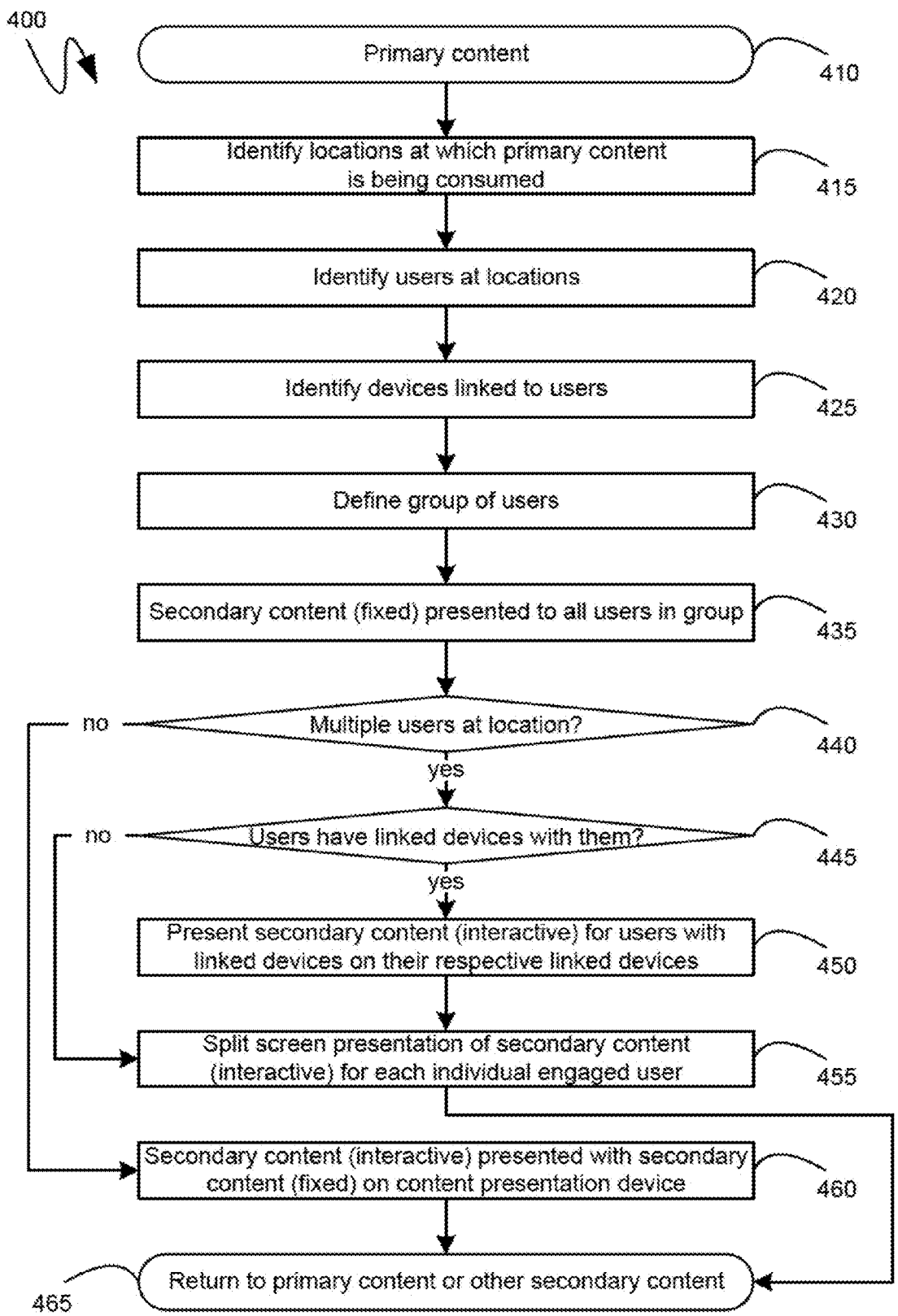
FIG. 4 is a flow diagram of an individualized content presentation to users in group settings.

Turning to FIG. 4, the exemplary flow diagram 400 shown therein illustrates an exemplary series of steps that can be performed to provide individually interactive content to individual users among a defined group of users that was consuming primary content. Initially, at step 410 primary content can be presented to such users. As indicated previously, such primary content can include movies, television shows, games, videos, music, and other like primary, or user-selected content. According to one aspect, such primary content can be presented together with the occasional presentation of secondary content. According to a common example, the primary content can be advertising-supported content, and the secondary content can be the corresponding advertisements.

Subsequently, at steps 415 through 430, the group of users can be defined based upon received or collected user information. While steps 415 through 430 are illustrated in sequence, such is provided by way of example and ease of illustration, and is not meant to represent that any of the steps 415 through 425 are necessarily preconditions for one another. More specifically, at step 415, different geographic or virtual locations at which primary content is being consumed can be identified. For example, information can be received, or obtained, at step 415, that is indicative of the physical locations of one or more users, indicative of other users that are determined to be proximate thereto, or otherwise indicative of a user's physical location. At step 420, an identification of specific ones of the users consuming primary content can be performed. As indicated previously such an identification can be based on user-provided login information, facial recognition, or other like user identification mechanisms. Identification of devices linked to the users that have been identified can be further obtained at step 425. For example, the user can have indicated, on an account, or can have otherwise linked thereto, information regarding other computing devices utilized by the user including, for example, cellular telephones, tablets, and other like portable or personal computing devices.

Subsequently, at step 430, based upon the information received at steps 415 through 425, a group of users can be defined. As indicated previously, a defined group of users can be defined based upon the primary content that they are consuming, such as that which can have been identified at step 415. For example, users engaged in a video chat session can be defined to be a single group of users. Similarly, users playing a multi-user game together with one another, within the context of the game, can be defined as a group of users, even though such users may not be physically co-located with one another.

At step 435, secondary content can be presented substantially simultaneously to all the users in the group that was defined, step 430. More specifically, and as was described in detail above, secondary content can be selected based on user-delineating factors, advertising factors, and other like content-to-user matching factors. Once such secondary content is selected, it can be provided to all the users and the defined group of users at step 440. According to one aspect, the secondary content provided at step 435 can, at least initially, comprise fixed, or non-interactive, secondary content. At step 440, a determination can be made as to whether one or more of the locations, to which the secondary content is being presented, to the defined group of users, includes multiple users at that location, such as multiple users consuming content from a single display device. If no such multiple users at a single location consuming content from a single display device are detected, the flow diagram 400 can proceed to step 460 in which an interactive portion, of the secondary content whose presentation was commenced at step 435, can be presented to the users. Subsequently, at step 465, content presentation to the users can return to the presentation of primary content, or can proceed to other secondary content, including in accordance with the steps of the exemplary flow diagram 400 of FIG. 4.

If, however, at step 440, it is determined that at least one location comprises multiple users consuming content from a single display device, processing can proceed to step 445, at which a determination can be made as to whether any of the multiple users at such a single location have linked computing devices with them that can be utilized to display an interactive portion of the secondary content, whose display commenced at step 435. If such linked devices are detected, such as at step 445, processing can proceed to step 450, where an interactive portion of the secondary content can be presented on such linked devices, thereby enabling those users to individually interact with such interactive content through their linked devices. Processing can then proceed to step 455 where, for those users that were not found to be linked with auxiliary devices, such as at step 450, the interactive portion of the secondary content can be individually displayed to such users, and can be individually interactive to specific ones of such users, within subsections of a content presentation area of a single display device through which such users were consuming the primary content, such as that which was being provided at step 410. Conversely, if, at step 445, it was determined that none of the users had linked devices with them, processing can have skipped step 450, and can have proceeded directly to step 455. Additionally, as indicated previously, the presentation of interactive portions of the secondary content on linked or auxiliary devices, such as at step 450, can be performed as an extension to the presentation of the interactive portion of the secondary content in subsections of the content presentation area of a single display device, such as at step 455. According to an alternative aspect, those users to whom the interactive portion of the secondary content is presented on a linked device, such as at step 450, need not have a separate subsection of the content display area of a single display device dedicated to them, such as at step 455. Subsequent to the performance of step 455, content presentation to the users can return to the presentation of primary content, as indicated by step 465, or can proceed to other secondary content, including in accordance with the steps of the exemplary flow diagram 400 of FIG. 4.

Figure 5:
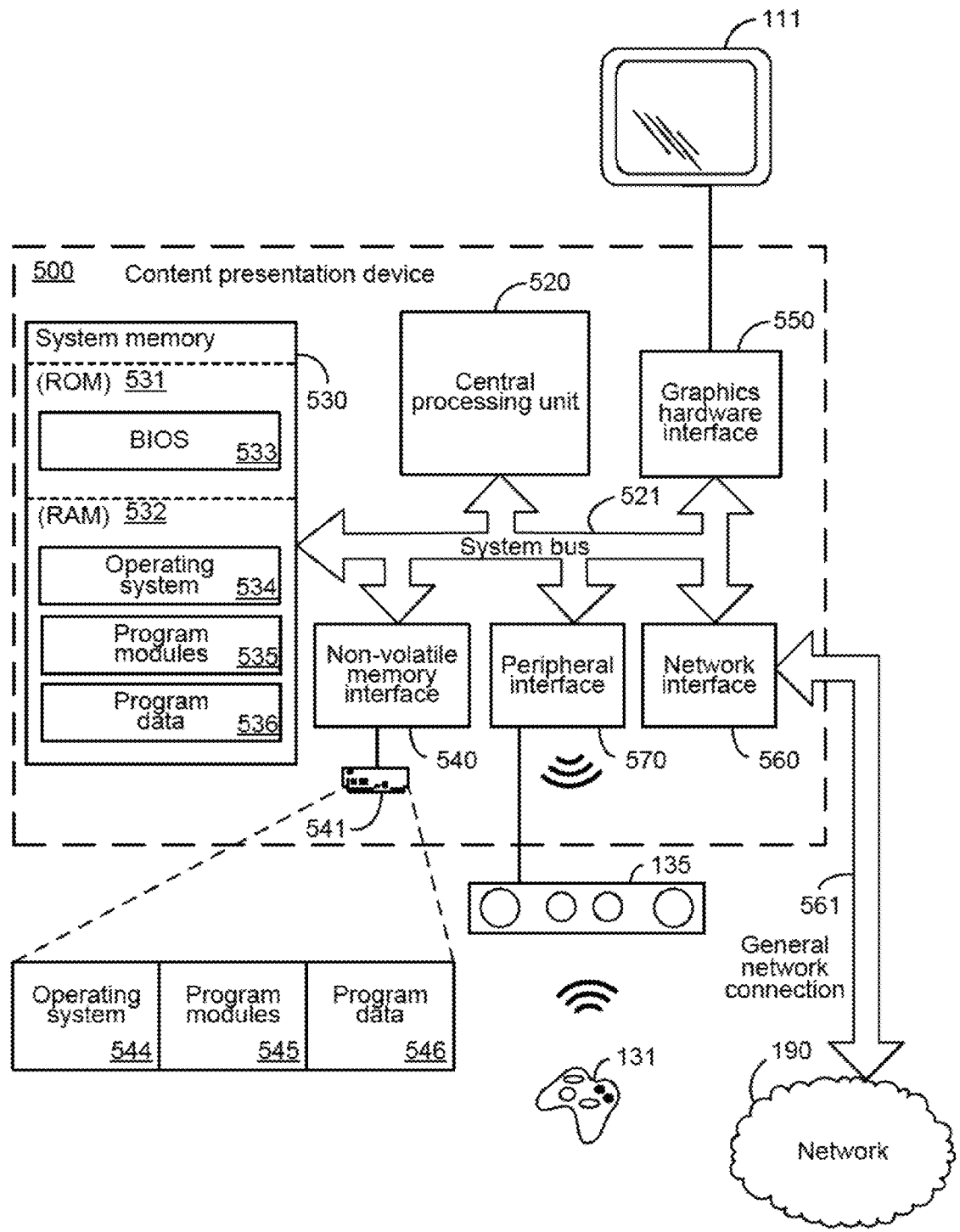
FIG. 5 is a block diagram of an exemplary content presentation device.

Turning to FIG. 5, an exemplary content presentation device 500 is illustrated which can perform some or all of the mechanisms and actions described above. The exemplary content presentation device 500 can include, but is not limited to, one or more central processing units (CPUs) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. The content presentation device 500 can include graphics hardware, including, but not limited to, a graphics hardware interface 550 and the display device 111, described previously. Depending on the specific physical implementation, one or more of the CPUs 520, the system memory 530 and other components of the content presentation device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The content presentation device 500 also typically includes computer readable media, which can include any available media that can be accessed by content presentation device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the content presentation device 500. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within content presentation device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

The content presentation device 500 may also include other removable/non-removable, volatile/nonvolatile computer storage media. By way of example only, FIG. 5 illustrates a hard disk drive 541 that reads from or writes to non-removable, nonvolatile magnetic media. Other removable/non-removable, volatile/nonvolatile computer storage media that can be used with the exemplary content presentation device include, but are not limited to, magnetic tape cassettes, flash memory cards, digital versatile disks, digital video tape, solid state RAM, solid state ROM, and the like. The hard disk drive 541 is typically connected to the system bus 521 through a non-volatile memory interface such as interface 540.

The drives and their associated computer storage media discussed above and illustrated in FIG. 5, provide storage of computer readable instructions, data structures, program modules and other data for the content presentation device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The content presentation device 500 may operate in a networked environment using logical connections to one or more remote computers. The content presentation device 500 is illustrated as being connected to the general network connection 561 through a network interface or adapter 560, which is, in turn, connected to the system bus 521. In a networked environment, program modules depicted relative to the content presentation device 500, or portions or peripherals thereof, may be stored in the memory of one or more computing devices that are communicatively coupled to the content presentation device 500 through the general network connection 561. For example, at least some of the program models 545 and program data 546 can be stored on computer-readable storage media remote from the content presentation device 500 and accessible by the content presentation device 500 over the network 190 via the general network connection 561 shown in FIG. 5. In such an instance, the relevant portions of the program modules 545 and/or program data 546 can be streamed or otherwise communicated in real-time or in pseudo-real-time to the content presentation device 500 to be executed and/or utilized thereby in the same manner as if such program modules 545 and/or program data 546 were stored on a local storage device of the content presentation device 500, such as, for example, the hard disk drive 541. It will be appreciated that the network connections shown are exemplary and other means of establishing a communications link between computing devices may be used.

Additionally, the content presentation device 500 can also include, or communicate with, user interface and input peripherals, including, but not limited to the game controller 151, the remote control 152 and the audio/video input device 155 that were described previously with reference to FIG. 1. Other types of input peripherals can equally be utilized, including more traditional computing device input peripherals, such as a keyboard, a trackpad, or a mouse. The display 111 can, itself, be an input peripheral capable of receiving touch-based user input, such as a touch-sensitive, or multi-touch capable, display device. Such input peripherals can be communicationally coupled to the system bus 121 via a peripheral interface 570. Such communicational couplings can be wired, as exemplarily illustrated in FIG. 5 with the wired connection between the peripheral interface 570 and the audio/video input device 155, or they can be wireless, as exemplarily illustrated in FIG. 5 with the wireless connection between the peripheral interface 570 and the game controller 151 and the remote control 152.

Although described as a single physical device, the exemplary content presentation device 500 can be a virtual content presentation device, in which case the functionality of the above-described physical components, such as the CPU 520, the system memory 530, the network interface 560, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary content presentation device 500 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "content presentation device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a method of generating differing content for different ones of a group of users, the method comprising the steps of: delineating the group of users based on an activity that is simultaneously being engaged in by each user delineated in the group of users, the activity comprising consuming video content; determining a first set users comprising at least two users, from the delineated group of users, that are co-located and are simultaneously consuming the video content from a shared display device; determining a second set of users comprising at least one user, from the delineated group of users, each having a personal computing device co-located with them, the personal computing device differing from the device through which the second set of users is consuming the video content; generating non-interactive content within a first portion of a content presentation area of the shared display device, the first portion comprising less than a whole of the content presentation area of the shared display device; generating, on at least some of the personal computing devices co-located with the second set of users, interactive content associated with the non-interactive content being generated within the first portion of the content presentation area of the shared display device, the interactive content, generated on a one of the personal computing devices, being responsive to user input provided to that personal computing device; and separately generating the interactive content within individual subdivisions of a subdivided second portion of the content presentation area of the shared display device, the second portion being different from, and distinct from, the first portion, wherein each separately generated interactive content in each subdivision is responsive to a specific one of the first set of users.

A second example is the method of the first example, further comprising the steps of: subdividing the second portion of the content presentation area of the shared display device into the subdivisions based at least on a quantity of users in the determined first set of users such that each user in the first set of users has one subdivision within which the separately generated interactive content is responsive to only that user.

A third example is the method of the second example, wherein the subdividing the second portion of the content presentation area of the shared display device is further based on at quantity of users in the determined second set of users such that the second set of users that have had the interactive content generated on their personal computing device that is co-located with them have no subdivision within which the separately generated interactive content is responsive to only them.

A fourth example is the method of the first example, wherein the interactive content generated on a first personal computing device co-located with a first one of the second set of users differs from, and is an extension of, the interactive content generated within a first one of the individual subsections that is also responsive to the first one of the second set of users.

A fifth example is the method of the first example, further comprising the steps of: detecting that a new user has become co-located with the first set of users; delineating an updated group of users comprising the new user; re-performing the separately generating the interactive content within the individual subdivisions, the individual subdivisions now including a new subdivision within which interactive content responsive to the new user is separately generated.

A sixth example is the method of the first example, further comprising the steps of: detecting that a first user, from among the first set of users, is no longer co-located with the first set of users; delineating an updated group of users excluding the first user; re-performing the separately generating the interactive content within the individual subdivisions, the individual subdivisions no longer comprising a previous subdivision within which interactive content responsive to the first user was separately generated.

A seventh example is the method of the first example, further comprising the steps of: generating, within the first portion of the content presentation area of the shared display device, subsequent content unassociated with the non-interactive content, while the interactive content associated with the non-interactive content continues to be generated within the individual subdivisions of the subdivided second portion of the content presentation area of the shared display device.

An eighth example is the method of the first example, further comprising the steps of: identifying at least some of the users of the delineated group of users based on an account the at least some of the users logged into as part of the engaging, by the at least some of the users, of the activity.

A ninth example is the method of the first example, further comprising the steps of: identifying at least some of the users of the delineated group of users based on facial recognition due to a proximity of the at least some of the users to at least one audio/visual input device while the at least some of the users are engaging in the activity.

A tenth example is the method of the first example, further comprising the steps of: storing information regarding interactions of each user in the delineated group of users with the interactive content.

An eleventh example is the method of the first example, wherein the video content is advertising-sponsored content; and wherein further the non-interactive content and the interactive content are portions of a same advertisement.

A twelfth example is a content presentation device for increasing user interaction performance while consuming video content as part of a group of users, the content presentation device comprising: one or more processing units that execute computer-executable instructions; a graphics hardware interface communicationally coupling the content presentation device to a physical display device such that the computer-executable instructions being executed by the one or more processing units cause physical changes to the physical display device, thereby generating display content on the physical display device; one or more computer-readable storage media comprising computer-executable instructions which, when executed by at least some of the one or more processing units, cause the content presentation device to perform steps comprising: generating non-interactive content within a first portion of a content presentation area of the physical display device, the first portion comprising less than a whole of the content presentation area of the physical display device; generating, on at least some personal computing devices, separate from the content presentation device and co-located with a second set of users, from among the group of users, interactive content associated with the non-interactive content being generated within the first portion of the content presentation area of the shared display device, the interactive content, generated on a one of the personal computing devices, being responsive to user input provided to that personal computing device; and separately generating the interactive content within individual subdivisions of a subdivided second portion of the content presentation area of the shared display device, the second portion being different from, and distinct from, the first portion, wherein each separately generated interactive content in each subdivision is responsive to a specific one of a first set of users also from among the group of users.

A thirteenth example is the content presentation device of the twelfth example, wherein the one or more computer-readable storage media comprise further computer-executable instructions which, when executed by at least some of the one or more processing units, cause the content presentation device to perform further steps comprising: subdividing the second portion of the content presentation area of the shared display device into the subdivisions based at least on a quantity of users in the determined first set of users such that each user in the first set of users has one subdivision within which the separately generated interactive content is responsive to only that user.

A fourteenth example is the content presentation device of the thirteenth example, wherein the subdividing the second portion of the content presentation area of the shared display device is further based on at quantity of users in the determined second set of users such that the second set of users that have had the interactive content generated on their personal computing device that is co-located with them have no subdivision within which the separately generated interactive content is responsive to only them.

A fifteenth example is the content presentation device of the twelfth example, wherein the interactive content generated on a first personal computing device co-located with a first one of the second set of users differs from, and is an extension of, the interactive content generated within a first one of the individual subsections that is also responsive to the first one of the second set of users.

A sixteenth example is the content presentation device of the twelfth example, wherein the one or more computer-readable storage media comprise further computer-executable instructions which, when executed by at least some of the one or more processing units, cause the content presentation device to perform further steps comprising: re-performing the separately generating the interactive content within the individual subdivisions, the individual subdivisions now including a new subdivision within which interactive content responsive to a new user, of the group of users, is separately generated.

A seventeenth example is the content presentation device of the twelfth example, wherein the one or more computer-readable storage media comprise further computer-executable instructions which, when executed by at least some of the one or more processing units, cause the content presentation device to perform further steps comprising: re-performing the separately generating the interactive content within the individual subdivisions, the individual subdivisions no longer comprising a previous subdivision within which interactive content responsive to a first user, who is no longer part of the group of users, was separately generated.

An eighteenth example is the content presentation device of the twelfth example, wherein the one or more computer-readable storage media comprise further computer-executable instructions which, when executed by at least some of the one or more processing units, cause the content presentation device to perform further steps comprising: generating, within the first portion of the content presentation area of the shared display device, subsequent content unassociated with the non-interactive content, while the interactive content associated with the non-interactive content continues to be generated within the individual subdivisions of the subdivided second portion of the content presentation area of the shared display device.

A nineteenth example is the content presentation device of the twelfth example, wherein the video content is advertising-sponsored content; and wherein further the non-interactive content and the interactive content are portions of a same advertisement.

A twentieth example is a system comprising: a server computing device configured to perform steps comprising: delineating a group of users based on an activity that is simultaneously being engaged in by each user delineated in the group of users, the activity comprising consuming video content; determining a first set users comprising at least two users, from the delineated group of users, that are co-located and are simultaneously consuming the video content from a shared display device; and determining a second set of users comprising at least one user, from the delineated group of users, each having a personal computing device co-located with them, the personal computing device differing from the device through which the second set of users is consuming the video content; and a content presentation device configured to perform steps comprising: generating non-interactive content within a first portion of a content presentation area of a physical display device communicationally coupled to the content presentation device, the first portion comprising less than a whole of the content presentation area of the physical display device; generating, on at least some personal computing devices, separate from the content presentation device and co-located with a second set of users interactive content associated with the non-interactive content being generated within the first portion of the content presentation area of the shared display device, the interactive content, generated on a one of the personal computing devices, being responsive to user input provided to that personal computing device; and separately generating the interactive content within individual subdivisions of a subdivided second portion of the content presentation area of the shared display device, the second portion being different from, and distinct from, the first portion, wherein each separately generated interactive content in each subdivision is responsive to a specific one of a first set of users.

As can be seen from the above descriptions, mechanisms for increasing user interaction performance in group settings have been presented. In view of the many possible variations of the subject matter described herein, we claim as our invention all such embodiments as may come within the scope of the following claims and equivalents thereto.

We claim:

1. A method of generating differing content for different ones of a group of users, the method comprising the steps of:
   delineating the group of users based on an activity that is simultaneously being engaged in by each user delineated in the group of users, the activity comprising consuming video content;
   determining a set of co-located users, from the delineated group of users, that are co-located with each other and are simultaneously consuming the video content from a shared display device;
   determining which of the set of co-located users have associated personal computing devices physically with them, the associated personal computing devices differing from the shared display device;
   determining a quantity of the set of co-located users who were not determined to have associated personal computing devices with them;
   generating non-interactive video content within a first portion of a content presentation area of the shared display device, the first portion comprising less than a whole of the content presentation area of the shared display device;
   generating, for presentation on at least some of the associated personal computing devices, interactive content associated with the non-interactive video content being generated within the first portion of the content presentation area of the shared display device, the interactive content, generated on a one of the associated personal computing devices, being responsive to user input provided to that personal computing device;

subdividing a second portion of the content presentation area of the shared display device into subdivisions based on the determined quantity of the set of co-located users who were not determined to have associated personal computing devices with them, the second portion being different from, and distinct from, the first portion; and generating the interactive content separately within each of the subdivisions such that each separately generated interactive content in each subdivision is responsive to a unique one of the set of co-located users who were not determined to have associated personal computing devices with them.

2. The method of claim 1, wherein the subdividing the second portion of the content presentation area of the shared display device into the subdivisions based on the determined quantity of the set of co-located users who were not determined to have associated personal computing devices with them comprises subdividing the second portion of the content presentation area of the shared display device into a quantity of subdivisions equal to the determined quantity of the set of co-located users who were not determined to have associated personal computing devices with them.

3. The method of claim 1, further comprising the steps of: detecting that a new user has become co-located with the set of co-located users;
determining whether the new user has an associated personal computing device physically with them; and
re-subdividing the second portion of the content presentation area of the shared display device to now include a new subdivision within which interactive content responsive to the new user is separately generated if the new user was not determined to have the associated personal computing device with them.

4. The method of claim 1, further comprising the steps of: detecting that a first user, from among the set of co-located users, is no longer co-located with them; and
re-subdividing the second portion of the content presentation area of the shared display device such that the subdivisions no longer comprise a previous subdivision within which interactive content responsive to the first user was separately generated if the first user was one of the co-located users that were not determined to have associated personal computing devices with them.

5. The method of claim 1, further comprising the steps of: generating, within the first portion of the content presentation area of the shared display device, subsequent content unassociated with the non-interactive content, while the interactive content associated with the non-interactive content continues to be generated within the subdivisions of the second portion of the content presentation area of the shared display device.

6. The method of claim 1, wherein the determining which of the set of co-located users have associated personal computing devices with them is based on user accounts logged into as part of the engaging of the activity.

7. The method of claim 1, further comprising the steps of: identifying at least some of the users of the delineated group of users based on facial recognition due to a proximity of the at least some of the users to at least one audio/visual input device while the at least some of the users are engaging in the activity.

8. The method of claim 1, further comprising the steps of: storing information regarding interactions of each user in the delineated group of users with the interactive content.

9. The method of claim 1, wherein the video content is advertising-sponsored content; and wherein further the non-interactive content and the interactive content are portions of a same advertisement.

10. A content presentation device for increasing user interaction performance during user consumption of video content as part of a group of users, the content presentation device comprising:

one or more processing units that execute computer-executable instructions;

a graphics hardware interface communicationally coupling the content presentation device to a physical display device such that the computer-executable instructions being executed by the one or more processing units cause physical changes to the physical display device, thereby generating display content on the physical display device;

one or more computer-readable storage media comprising computer-executable instructions which, when executed by at least some of the one or more processing units, cause the content presentation device to:

generate non-interactive content within a first portion of a content presentation area of the physical display device, the first portion comprising less than a whole of the content presentation area of the physical display device;

generate, for presentation on personal computing devices associated with users from the group of users, interactive content associated with the non-interactive content, the interactive content being responsive to user input provided to the personal computing device on which that interactive content is being generated; and generate the interactive content separately within each subdivisions of a subdivided second portion of the content presentation area of the shared display device, the second portion being different from, and distinct from, the first portion, wherein each separately generated interactive content in each subdivision is responsive to a unique one of the group of users;

wherein a quantity of subdivisions in the subdivided second portion of the content presentation area of the shared display device is based on a quantity of users, co-located with the shared display device and consuming the video content therefrom, that were not determined to have associated personal computing devices with them.

11. The content presentation device of claim 10, wherein the quantity of subdivisions in the subdivided second portion of the content presentation area of the shared display device is equal to the quantity of users, co-located with the shared display device and consuming the video content therefrom, that were not determined to have associated personal computing devices with them.

12. The content presentation device of claim 10, wherein the one or more computer-readable storage media comprise further computer-executable instructions which, when executed by at least some of the one or more processing units, cause the content presentation device to generate the interactive content separately within a new subdivision, of the now more subdivided second portion of the content presentation area of the shared display device, within which the interactive content, responsive to a new user, of the group of users, is separately generated.

13. The content presentation device of claim 10, wherein the one or more computer-readable storage media comprise further computer-executable instructions which, when executed by at least some of the one or more processing units, cause the content presentation device to: regenerating the interactive content separately within each subdivision, the subdivisions no longer comprising a previous subdivision within which interactive content responsive to a first user, who is no longer part of the group of users, was separately generated.

14. The content presentation device of claim 10, wherein the one or more computer-readable storage media comprise further computer-executable instructions which, when executed by at least some of the one or more processing units, cause the content presentation device to: generate, within the first portion of the content presentation area of the shared display device, subsequent content unassociated with the non-interactive content, while the interactive content associated with the non-interactive content continues to be generated within the subdivisions of the subdivided second portion of the content presentation area of the shared display device.

15. The content presentation device of claim 10, wherein the video content is advertising-sponsored content; and wherein further the non-interactive content and the interactive content are portions of a same advertisement.

16. A system comprising:
a server computing device configured to perform steps comprising:
delineating a group of users based on an activity that is simultaneously being engaged in by each user delineated in the group of users, the activity comprising consuming video content;
determining a set of co-located users, from the delineated group of users, that are co-located with each other and are simultaneously consuming the video content from a shared display device; and
determining which of the set of co-located users have associated personal computing devices physically with them, the associated personal computing devices differing from the shared display device;
determining a quantity of the set of co-located users who were not determined to have associated personal computing devices with them; and
a content presentation device configured to perform steps comprising:
generating non-interactive content within a first portion of a content presentation area of the shared display device, which is communicationally coupled to the content presentation device, the first portion comprising less than a whole of the content presentation area of the shared display device;
generating, for presentation on at least some of the associated personal computing devices, interactive content associated with the non-interactive content being generated within the first portion of the content presentation area of the shared display device, the interactive content being responsive to user input provided to the associated personal computing device on which that interactive content is being generated; and
generating the interactive content separately within each subdivisions of a subdivided second portion of the content presentation area of the shared display device, the second portion being different from, and distinct from, the first portion, wherein each separately generated interactive content in each subdivision is responsive to a unique one of the set of co-located users who were not determined to have associated personal computing devices with them.

17. The method of claim 1, wherein the delineated group of users includes a first remote user who is remote from the set of co-located users, the method further comprising:
generating both the interactive content and the non-interactive content on a remote display device that is utilized by the first remote user to consume the video content.

18. The content presentation device of claim 10, wherein the one or more computer-readable storage media comprise further computer-executable instructions which, when executed by at least some of the one or more processing units, cause the content presentation device to: obtain identifying information from at least some of the users that are co-located with the shared display device; and wherein further the determining whether users, co-located with the shared display device, have associated personal computing devices with them is performed based user accounts of the at least some of the users from whom identifying information was obtained.

19. The content presentation device of claim 10, further comprising a peripheral interface communicationally coupling the content presentation device to an audio/visual input device, wherein the one or more computer-readable storage media comprise further computer-executable instructions which, when executed by at least some of the one or more processing units, cause the content presentation device to: obtain, through the audio/visual input device, identifying information from at least some of the users that are co-located with the shared display device, the identifying information being at least one of: a face of a user or a voice of a user.

20. The content presentation device of claim 10, wherein the one or more computer-readable storage media comprise further computer-executable instructions which, when executed by at least some of the one or more processing units, cause the content presentation device to: obtain information regarding interactions of multiple users, in the group of users, with the interactive content.

* * * * *